Feb. 12, 1929.　　　　　　　　　　　　　　1,701,596
J. G. VINCENT
VIBRATION DAMPER FOR INTERNAL COMBUSTION ENGINES
Filed Jan. 9, 1928　　　2 Sheets-Sheet 1

Inventor
JESSE G. VINCENT
By Miller Tibbitts
Attorney

Feb. 12, 1929.

J. G. VINCENT 1,701,596

VIBRATION DAMPER FOR INTERNAL COMBUSTION ENGINES

Filed Jan. 9, 1928    2 Sheets-Sheet 2

Inventor
JESSE G. VINCENT.
By
Attorney

Patented Feb. 12, 1929.

1,701,596

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

VIBRATION DAMPER FOR INTERNAL-COMBUSTION ENGINES.

Application filed January 9, 1928. Serial No. 245,323.

This invention relates to internal combustion engines and more particularly to means for controlling torsional vibration in the crank shafts of such engines.

It has for one of its objects to provide a simple and effective device adapted to damp torsional vibration in an engine shaft.

Another object of the invention is to provide a vibration damper having an integral inertia member capable of expansion to vary the damping friction.

Another object of the invention is to provide a vibration damper having an integral inertia member capable of exerting a variable pressure upon its supporting means in accordance with changes in speed.

Another object of the invention is to provide a vibration damper for shafts in which the frictional dissipation of energy is entirely effected between an expansible inertia member and the shaft mounting for said member.

Other objects of the invention will appear from the following description taken in connection with the drawings, which form a part of this specification, and in which.

Figure 3:
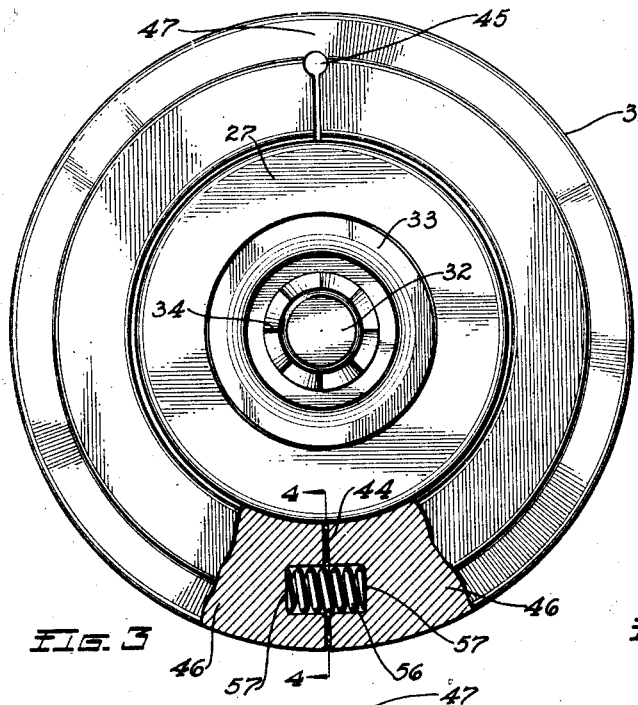
Fig. 3 is a view similar to Fig. 1, broken away and partially in section, showing a modified form of the damping means.
Figure 4:
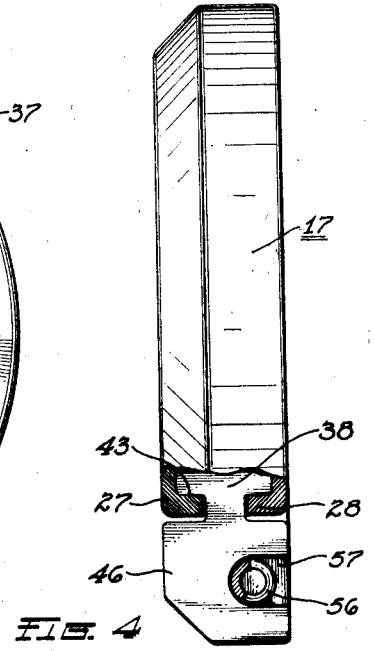
Figure 5:
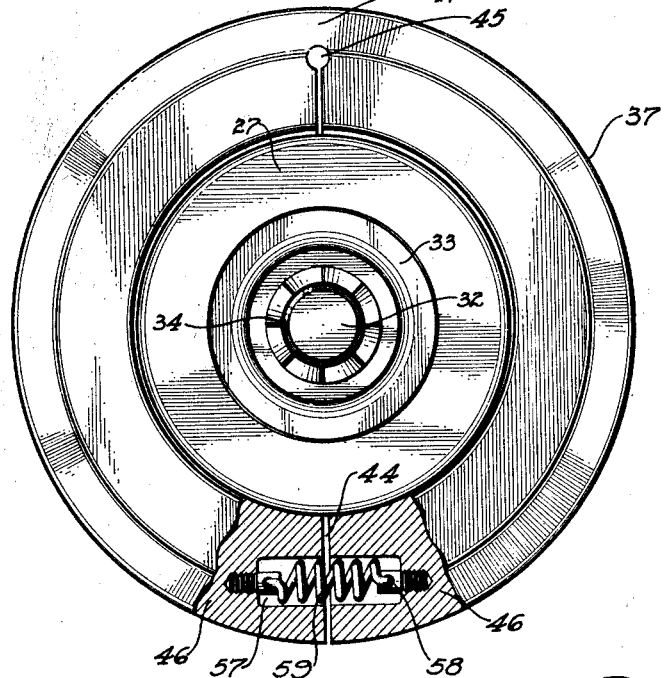
Figure 6:
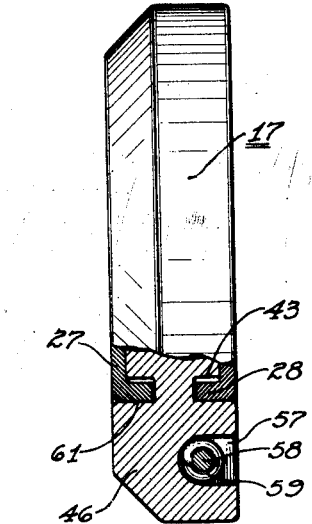

Fig. 4 is a side elevation of the form of device shown in Fig. 3, partially in section substantially on the line 4—4 of Fig. 3, and Figs. 5 and 6 are views similar to Figs. 3 and 4, showing another modification of the invention.

Figure 1:
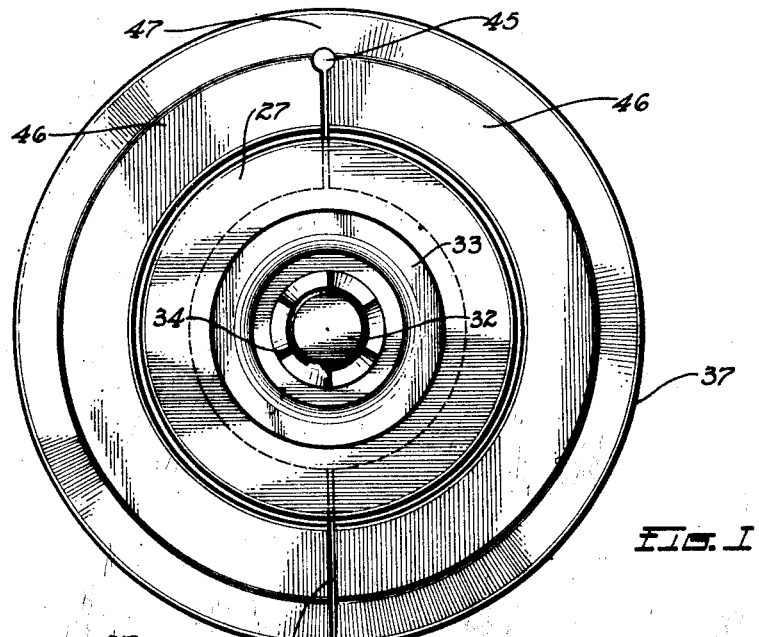
Fig. 1 is an end elevation of a vibration damper embodying this invention.
Figure 2:
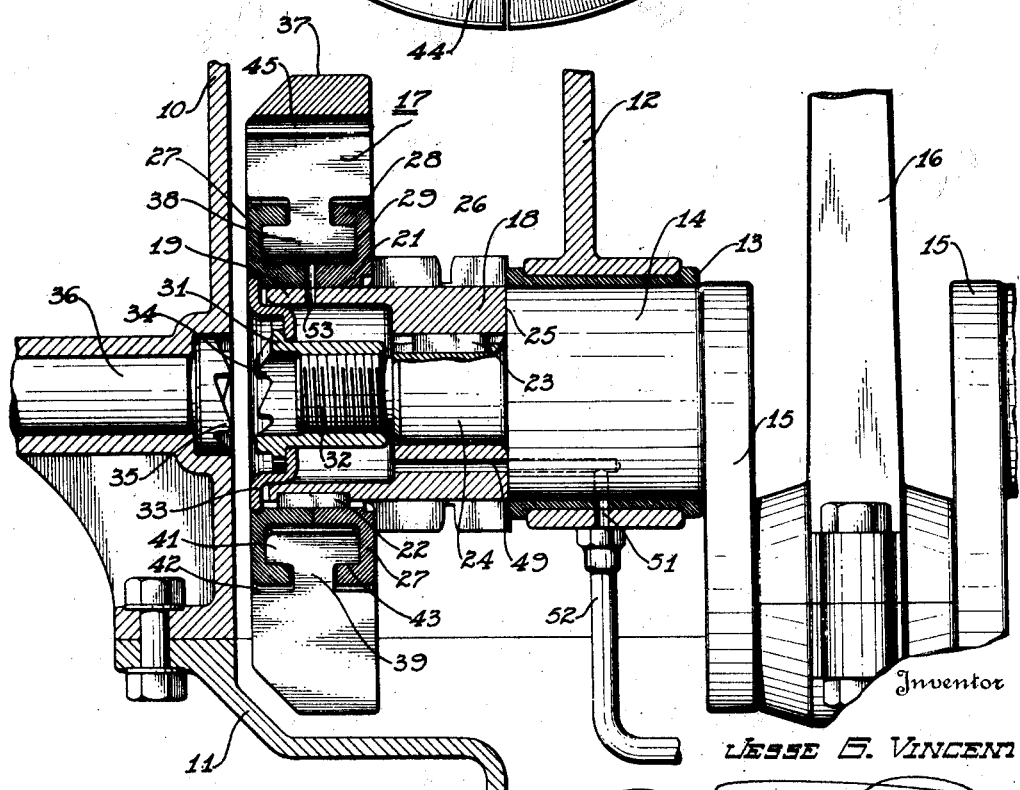
Fig. 2 is a vertical longitudinal section through part of an internal combustion engine provided with the damper shown in Fig. 1.

Referring to the drawing, in Fig. 2 at 10 is represented the crank case of an internal combustion engine having a removable lower cover or oil pan 11 and provided with transverse webs, such as shown at 12. These webs support suitable aligned bearings 13 for an engine crank shaft 14, which has the usual integral cranks 15, each of which is connected by a connecting rod 16 to a piston mounted in one of the engine cylinders. The piston and cylinder are not shown in the drawings, but are of usual construction.

The damping means of this invention is illustrated in Fig. 2 as mounted at or adjacent the end of the crank shaft 14. It is in the form of an annular sectional inertia member 17, mounted coaxially with the crank shaft on a suitable part thereof. As shown, this part is a supporting member 18 having a forwardly projecting portion 19 on which a bearing or retaining member 21 is keyed as indicated at 22. The bearing member 18 is keyed as at 23 to the reduced end 24 of the crank shaft 14, and is axially positioned thereon by means of a shoulder 25 formed by reducing the end of the shaft. A gear or chain sprocket 26 may be formed on the member 18 if desired and used to drive the engine camshaft and other engine accessories, which are not shown in the drawing. The annular retaining member 21 comprises a pair of friction rings 27 placed back to back upon the extended portion 19 of the member 18, and each provided with axially disposed peripheral flanges 28 defining a circumferential groove 29.

The member 21 and the shaft member 18 are retained in axial position on the shaft by a nut 31 on the threaded end 32 of the shaft. This nut operates through a dished washer 33 against the radial face of the outer friction ring 27, so that both the friction rings, and the member 18 which bears against them, are rigidly secured to the crank shaft to rotate therewith. The end of the nut 31 is peripherally formed with clutch teeth 34 which may be engaged with similar teeth 35 on an endwise movable starter shaft 36. This is the usual hand starting crank for manually rotating the crank shaft for starting.

The inertia member 17 is in the form of an annulus or ring having a peripherally disposed weight portion or rim 37 and an integral mounting portion 38 within said rim. The mounting portion includes a radially disposed web 39 having an axially disposed flange 41 defining grooves 42 in which the flanges 28 of the retaining member 21 are adapted to seat. The flange 41 thus provides a pair of peripheral shoulders 43 which form a bearing surface on which the inertia member 17 is rotatably mounted. This bearing surface also provides a friction connection between the inertia member and engine shaft.

In the form of the invention shown, the inertia member 17 is provided with a diametrically disposed slot 44 in the axial plane of the ring, which slot extends through the rim and the mounting portion on one side and through the mounting portion and part of the rim at the opposite side, terminating in a hole 45. This slot defines a pair of oppositely disposed weight segments 46, having a common connecting portion 47 at the rim of the device. Since the center of gravity of each of these segments 46 is removed from the axis of rotation, it follows that they will tend to separate in response to centrifugal force, causing the damper to increase its effective diameter, or expand. Such expansion is resisted by the connecting portion 47 which resiliently opposes separation of the segments, and it is also resisted by the contact pressure of the bearing surfaces 43 with the retainer flange 28. This contact pressure, of course, increases the friction between these parts, so that the damping action is automatically varied in response to changes in speed of the shaft. In this way a damping device is provided in which the damping effect is increased with the speed to better control the heavier vibrations which usually occur at the higher shaft speeds.

The bearing may be readily lubricated from the pressure oiling system of the engine, if desired. For this purpose a passage 49 is provided in the crank shaft communicating by a port 51 with the lubricating system 52 at the nearest crank shaft bearing 13. This bearing 49 communicates at its other end with the interior of the extension 19 on the member 18, and a duct 53 is provided from this space into the groove 29. At each revolution of the bearing a charge of oil is supplied to the passage 49 through the metering port 51, and thence through the duct 53 to the bearing surface. By properly choosing the size of the port 51, any desired amount of lubricant may be supplied to the bearing 43.

In Figs. 3 and 4 is shown a modified form of the device in which the pressure of the bearing surface 43 on the cooperating surface of the retainer flanges 28 is increased by the use of a spring 56. This spring is located between the adjacent ends of the segments 46, the ends being seated in aligned recesses 57, formed in the rim portions of the segments 46 in any convenient manner, as by milling from the side face of the segments, as clearly shown in Fig. 4. It will be evident that this spring 56 tends to expand the inertia member with a substantially constant force which acts to all times in addition to the centrifugal force of rotation. Thus not only does it increase the friction at the bearing surface but provides an initial friction which assists in starting the inertia member when the engine shaft is started from rest.

Another form of the device is shown in Figs. 5 and 6. In this arrangement the ends of the recesses 57 are provided with attachments 58 for the ends of a tension spring 59, which tends to draw the ends of the segments 46 together. It will be evident that this arrangement acts to contract the inertia member and that the tension of the spring 59 is opposed to the action of the centrifugal force on the segments 46. This transfers the initial friction from the inner surface 43 of the groove to the outer surface 61 thereof, the contact being with the outer faces of the flange 28, as clearly shown in Fig. 6. In the operation of this embodiment of this invention, the friction for starting is provided between the flange 28 and the friction surface 61, but as the shaft speeds up, the centrifugal force acting on the segments 46 gradually overcomes the tension of the spring 59 until the surfaces are separated and the friction becomes a minimum. Upon a further increase in speed the centrifugal force becomes sufficient to bring the surface 43 into contact with the flanges 12 whereupon the operation is the same as that of the embodiment illustrated in Figs. 3 and 4. It will be understood that the clearance between the surfaces 43 and 61, and the flanges 28, has been exaggerated in the drawing for the purpose of clearer illustration.

The damper shown in Figs. 5 and 6 may be used, for example, where damping is not desired through a certain speed range of the engine, but damping above this speed range is necessary. The extent of this range is determined by the relation between the spring pressure and the centrifugal force, so that in a given damper it may be readily varied by properly choosing the spring 59. This device also provides for the transfer of the starting friction from the damping surface 43 to a separate surface 61, thus avoiding undue wear of the parts.

It will be understood that various forms of the invention other than those described above may be used without departing from the spirit or scope of the invention.

Having thus described the invention, what is claimed and desired to be secured by Letters Patent is:

1. A vibration damper for shafts comprising a member secured to the shaft to rotate therewith, and an integral expansible inertia member mounted on the shaft member and frictionally engaging said member to resist relative rotation between the inertia member and the shaft.

2. A vibration damper for shafts comprising a member secured to the shaft to rotate therewith having axially disposed flanges, and an integral expansible inertia member having a portion disposed to rotate on and frictionally engage said flanges.

3. A vibration damper for shafts comprising an integral expansible inertia member, a shaft member on which the inertia member is rotatably mounted, and means forming a part of said shaft member frictionallly engaging the inertia member to retard relative rotation between the inertia member and the shaft.

4. A vibration damper for shafts comprising a bearing member secured to the shaft and having peripheral retaining flanges, and an integral annular inertia member having grooves to receive said flanges and diametrically slotted to expand into frictional engagement therewith in accordance with shaft speed.

5. A vibration damper for shafts comprising a member rigidly secured to the shaft having peripheral retaining means, and an inertia member rotatably mounted on and frictionally engaging the retaining means, said inertia member being diametrically slotted through one side and a portion of the opposite side to expand under centrifugal force and vary said frictional engagement.

6. A vibration damper for shafts comprising a supporting member carried by the shaft, and an inertia member rotatably mounted on said supporting member and having a friction connection therewith, said inertia member having a diametrically disposed slot whereby it expands in response to centrifugal force to vary the friction of said connection.

7. A vibration damper for shafts comprising a supporting member carried by the shaft, and an inertia member mounted on said supporting member and having a friction connection therewith, said inertia member being diametrically slotted to expand in response to changes in speed to vary the friction of said connection.

8. A vibration damper for crank shafts of internal combustion engines comprising a supporting member secured to the shaft, an annular inertia member surrounding the supporting member and rotatable about the shaft axis, said inertia member having a slot in a diametrical axial plane whereby it is deformable in response to centrifugal force, and retaining means between the supporting member and the inertia member frictionally engaging said inertia member to provide a variable damping friction in accordance with the deformation thereof.

9. A vibration damper for shafts comprising a supporting member secured to the shaft, an annular retaining member carried by the supporting member, an integral inertia member mounted on the retaining member to rotate about the shaft axis and having segmental portions radially movable in response to centrifugal force and frictionally engaging the retaining member, and spring means to vary the movement of said segmental portions.

10. A vibration damper for shafts comprising a shaft member, and an integral expansible inertia member mounted on and surrounding said shaft member, said members having engaging portions whereby expansion of the inertia member will increase the friction between said engaging portions.

11. A vibration damper for shafts comprising an integral annular inertia member rotatably mounted on the shaft and having an axially disposed slot defining segmental portions and a recess in the face of each segmental portion adjacent said slot, friction means between said inertia member and the shaft, and spring means in said recess adapted to urge the segmental portions into engagement with said friction means.

In testimony whereof I affix my signature.

JESSE G. VINCENT.